United States Patent
Bally et al.

(10) Patent No.: US 9,396,091 B2
(45) Date of Patent: Jul. 19, 2016

(54) END-TO END, LIFECYCLE AWARE, API MANAGEMENT

(71) Applicants: Teodor Joav Bally, San Jose, CA (US); Balakrishna Gottipati, Bangalore (IN); Matthias Tebbe, Walldorf (DE)

(72) Inventors: Teodor Joav Bally, San Jose, CA (US); Balakrishna Gottipati, Bangalore (IN); Matthias Tebbe, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/500,147

(22) Filed: Sep. 29, 2014

(65) Prior Publication Data

US 2016/0092344 A1    Mar. 31, 2016

(51) Int. Cl.
*G06F 9/44* (2006.01)
*G06F 11/36* (2006.01)
*H04L 29/08* (2006.01)
*G06F 9/445* (2006.01)

(52) U.S. Cl.
CPC .............. *G06F 11/3664* (2013.01); *G06F 8/60* (2013.01); *G06F 11/3684* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,352,338 B2 | 1/2013 | Duparc et al. | |
| 8,380,553 B2 | 2/2013 | Berger et al. | |
| 8,396,731 B2 | 3/2013 | Berger et al. | |
| 8,671,034 B2 | 3/2014 | Suenderhauf et al. | |
| 8,676,617 B2 | 3/2014 | Berger et al. | |
| 8,688,495 B2 | 4/2014 | Tebbe et al. | |
| 2007/0061731 A1* | 3/2007 | Dillon ..................... | G06F 9/541 715/733 |
| 2007/0294662 A1* | 12/2007 | Kim ....................... | B25J 9/1661 717/107 |
| 2008/0082569 A1* | 4/2008 | Mansour ................ | G06Q 10/10 |
| 2008/0120129 A1 | 5/2008 | Seubert et al. | |
| 2009/0171698 A1 | 7/2009 | Suenderhauf et al. | |
| 2009/0249280 A1* | 10/2009 | Mechelke ................. | G06F 8/20 717/102 |
| 2009/0320002 A1* | 12/2009 | Peri-Glass ........... | G06F 11/3688 717/131 |
| 2010/0037100 A1* | 2/2010 | Lopian ................ | G06F 11/3688 714/35 |
| 2010/0153158 A1 | 6/2010 | Wex et al. | |
| 2012/0180022 A1* | 7/2012 | Hopkins ................... | G06F 8/30 717/100 |
| 2012/0254825 A1* | 10/2012 | Sharma ..................... | G06F 8/34 717/101 |
| 2013/0074046 A1* | 3/2013 | Sharma ............... | G06F 11/3688 717/126 |
| 2013/0247123 A1* | 9/2013 | Bentley ............ | H04N 21/26291 725/114 |
| 2013/0325789 A1* | 12/2013 | Krishnan .......... | G06F 17/30563 707/602 |
| 2014/0006858 A1* | 1/2014 | Helfman ............. | G06F 11/1448 714/19 |
| 2014/0157224 A1* | 6/2014 | Capuozzo ................. | G06F 8/20 717/100 |
| 2014/0310591 A1* | 10/2014 | Nguyen .............. | G06F 17/2247 715/234 |
| 2015/0154012 A1* | 6/2015 | Wolfram ................. | H04L 67/10 717/176 |
| 2015/0248280 A1* | 9/2015 | Pillay ........................ | G06F 8/60 717/106 |

* cited by examiner

*Primary Examiner* — Insun Kang
(74) *Attorney, Agent, or Firm* — Fish & Richardson P.C.

(57) ABSTRACT

An application programming interface (API) consumption development environment (CDE) is integrated with an API administration component and a determination is made whether an existing API conforms to application development requirements. A desired API is defined including test data, and the desired API and test data is forwarded to an API developer as a development request. The API CDE is integrated with the API administration component. A developed API is deployed to an API provider creating an integration testing deployment, and the API administration component is notified of the integration testing deployment. The developed API is deployed to an API provider productive for productive use.

14 Claims, 5 Drawing Sheets

END-TO END, LIFECYCLE AWARE, API MANAGEMENT

BACKGROUND

An application programming interface (API) lifecycle is usually driven by an API provider (who may be responding to consumer requests). APIs may exist in various versions and software lifecycle states within a system landscape and are frequently developed like any software by API developers (including those of API consumers) using an integrated development environment (IDE). After a successful test within an IDE, a particular API is usually deployed in a test/quality landscape for further tests (e.g., integration tests). After successful further tests, the API is deployed in a productive landscape. These states (e.g., development version, test/quality version, and productive version) are typically managed by the API provider.

Current API management systems are usually restricted to basic API information to manage APIs. IDEs usually integrate only with an API provider but not to the API management system—meaning that API lifecycle information (e.g., from development to productive usage and finally to deprecation) is available in the IDE and from the API provider, but not available to the API management system. Without IDE integration to the API management system, information useful for API management purposes is unavailable (e.g., details on a new API version or a deprecation of the API, API documentation, test data for the API, etc.), which results in inefficient and more costly API management.

SUMMARY

The present disclosure relates to computer-implemented methods, computer-readable media, and computer systems for providing lifecycle-aware application programming interface (API) management. One computer-implemented method includes integrating an API consumption development environment (CDE) with an API administration component, determining whether an existing API conforms to application development requirements, defining a desired API and including test data, forwarding the defined API and test data to an API developer as a development request, integrating the API CDE with the API administration component, deploying a developed API to an API provider creating an integration testing deployment, notifying the API administration component of the integration testing deployment, and deploying the developed API to an API provider productive for productive use.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, comprising: using the CDE to obtain an API description and requesting generated or manually-provided example code illustrating consumption of the API.

A second aspect, combinable with any of the previous aspects, comprising requesting a mock service based on the defined API and the test data.

A third aspect, combinable with any of the previous aspects, comprising developing the defined API as the developed API.

A fourth aspect, combinable with any of the previous aspects, comprising unit testing the developed API.

A fifth aspect, combinable with any of the previous aspects, comprising determining that the developed API has passed unit testing.

A sixth aspect, combinable with any of the previous aspects, comprising notifying the API administration component of the integration testing deployment, deploying the developed API to an API provider productive for productive use; and notifying the API administration component of the deployment to the API provider productive.

The subject matter described in this specification can be implemented in particular implementations so as to realize one or more of the following advantages. First, API integrated development environments (IDEs) are integrated into both an API provider and an API management system. API lifecycle information (e.g., from development to productive usage and finally to deprecation—including details on a new API version or a deprecation of the API, API documentation, test data for the API, etc.) is available in the IDE and from the API provider, as well as to the API management system. Second, the effort necessary to manage APIs is lowered and enforces a more consistent integration of API management to API provider. This include integration of service registry components, an API development environment (IDE) and API management to support an API developer in providing detailed information of a developed API, tight integration between an API administration component and the API Provider to reflect the API provider managed lifecycle of APIs, integration of standard service discovery functionality to manage non enhanced API providers, Integration of service consumption development environments to support: developers of service consumers with API management information such as supported identification protocols as part of security policies of a specific API, easy discovery of APIs with comprehensive descriptions of the APIs (e.g. documentation, API Lifecycle information such as test version, API metadata such as WSDL or EDMX for OData), the definition of services that are currently not available including the generation of a mock service, and/or retrieval of generated example code to ease the consumption of an service. Third, a consumer API developer (and an API consumption development environment) is able to influence the API lifecycle—such as simply defining/requesting a new API. Fourth, API providers, API IDEs, and the API consumer need are more tightly integrated into the API management system resulting in costs and enhanced API consistency. Fifth, the API management system is aware of the API lifecycle by obtaining lifecycle relevant information from the API development environment and the API provider systems and provides relevant information to a consumer development environment (CDE) to reduce development effort and enhance the quality of an API consumer. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

An application programming interface (API) management system, as used in this document, is a system that allows managing APIs that are exposed by one or more API providers. For example an API management system can support the discovery of services and the definition and enforcement of a set of policies for APIs that are exposed by a particular API provider. These policies can contain rules, such as: 1) the users or a group of users that are allowed to use a specific API; 2) the amount of calls per time unit that will be forwarded to the API provider; 3) a price per call or time unit that is charged to an API consumer per API; and/or 4) supported identification protocols. Note that other rules can also be provided and that is example list is not meant to be limiting in any way.

Current API management systems include at least: 1) an API administration console that allows maintaining APIs and their policies and 2) an API gateway that enforces the defined policies. The API administration console is communicably coupled with the API gateway. The API provider is also communicably coupled to the API gateway and exposes APIs to the API gateway to allow the API gateway to apply defined polices. The API consumer is any device or program communicably coupled with the API gateway that consumes the APIs that are managed by the API gateway. In some implementations, these described components can be installed on different servers. A network setup may also ensure that the API provider is only reachable by the API consumer using the API gateway. Both the API provider and the API consumer are not part of the API management system.

An API lifecycle is usually driven by the API provider (who may be responding to consumer requests). APIs may exist in various versions and software lifecycle states within a system landscape and are frequently developed like any software by API developers (including those of API consumers) using an integrated development environment (IDE). After a successful test within an IDE, a particular API is usually deployed in a test/quality landscape for further tests (e.g., integration tests). After successful further tests, the API is deployed in a productive landscape. These states (e.g., development version, test/quality version, and productive version) are typically managed by the API provider. Furthermore, the description of APIs that are exposed by the API provider system but not managed at a certain point-in-time by the API management system may need to be pushed from the API provider to the API management system to allow more efficient management of APIs.

Current API management systems are usually restricted to basic API information to manage APIs associated with an API gateway. IDEs usually integrate only with an API provider but not to the API management system—meaning that API lifecycle information (e.g., from development to productive usage and finally to deprecation) is available in the IDE (e.g., an API development environment) and from the API provider and/or API consumer (e.g., using a consumption development environment (CDE)), but not available to the API management system. Without IDE integration to the API management system, information useful for API management purposes is unavailable (e.g., details on a new API version or a deprecation of the API, API documentation, test data for the API, etc.), which results in inefficient and more costly API management.

As the API lifecycle is typically driven by the API provider, an API consumer developer (and API CDE) is not able to influence the API lifecycle (e.g., requesting a new or updated API). What is needed is tighter integration between the API provider/API development environment and the API consumer/API CDE with the API management system to reduce costs, lower API management efforts, and/or to increase API consistency. This tighter integration would include:

Integration of the API development environment and API management to support the API developer at providing detailed information of a developed API.

Tight integration between an API administration component and the API provider to reflect the API provider managed lifecycle of APIs.

Integration of standard service discovery functionality to manage non-enhanced API providers.

Integration of service consumption development environment to support developers of service consumers with API management information such as the supported identification protocols as part of the security policy of a specific API, easy discovery of APIs with a comprehensive description of the APIs (e.g., documentation, API Lifecycle information like test version, API metadata like WSDL or EDMX for OData), the definition of services that are currently not available including the generation of a mock service, and/or retrieval of generated example code to ease the consumption of an service.

In some implementations, the lifecycle-aware API management system is notified from an API provider about new and/or changed APIs. This enables the system to automatically react or trigger a manual process. For example, the system may take over a policy from a test environment automatically if a version that had been successfully tested is deployed in a productive landscape. The automatic process could also, for example, trigger a workflow, such as a manual process, where only an administrator could approve the previously tested API/policy combination. The lifecycle-aware API management system is also able to check whether a defined policy refers to a correct API version even if the API version was deployed on a subsequent system.

Note that described API provider instances and lifecycle states (e.g., development, test, production, etc.) should not limit the described subject matter to the illustrated examples. In other possible implementations, there can be a specific system for regression testing or translation, with some, all, or alternate lifecycle states implementing a lifecycle-aware API management system with deep integration into the IDE's and API providers.

Figure 1:
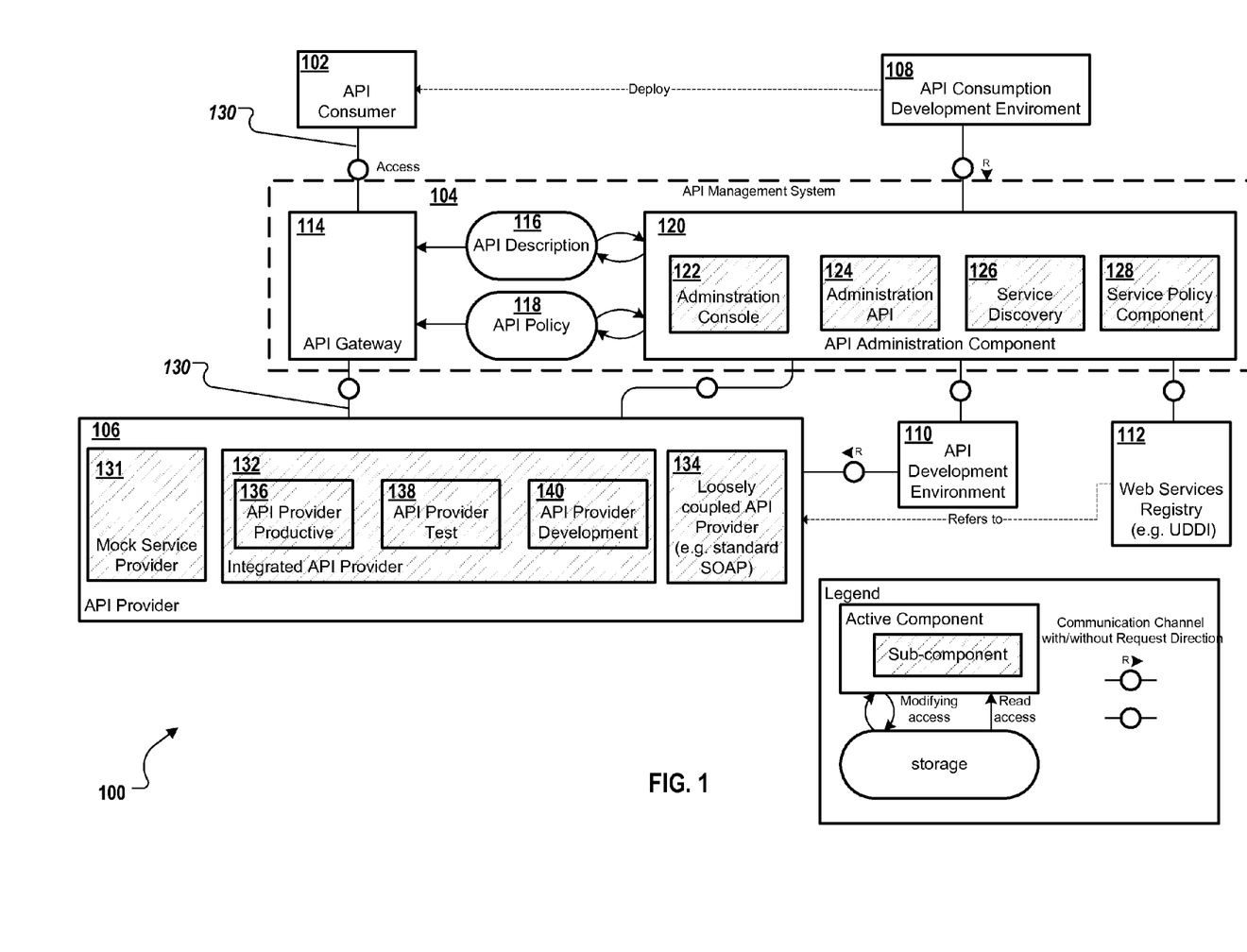
FIG. 1 is a high-level architecture block diagram illustrating an example distributed computing system (EDCS) for providing lifecycle-aware application programming interface (API) management according to an implementation.

FIG. 1 is a high-level architecture block diagram illustrating an example distributed computing system (EDCS) 100 for providing lifecycle-aware application programming interface (API) management according to an implementation. At a high level, the illustrated EDCS 100 includes or is made up of one or more communicably coupled computers (refer to FIG. 4) that communicate across a network 130 (note that although only two network 130 connections have been labeled in FIG. 1, one or more of the other indicated connections between components can also be considered part of network 130). In some implementations, the EDCS 100 or portions of the EDCS 100 can operate within a cloud-computing-based environment. The illustrated EDCS 100 includes an API consumer 102, API management system 104, and an API provider 106. Also included are an API CDE 108, web service registry 110, and API development environment 112. The described illustration is only one possible implementation of the described subject matter and is not intended to limit the disclosure to the single described implementation. Those of ordinary skill will appreciate the fact that the described components can be connected, combined, and used in alternative ways consistent with this disclosure.

As stated above, the API consumer 102 is any device or program communicably coupled with the API management system (particularly the API gateway) that consumes managed APIs. In some implementations, the API consumer 102 consumes an API like a simple object access protocol (SOAP) service or an open data protocol (ODATA) service. Open Data Protocol (OData) is a generic web protocol for querying and updating data over networks and allows for a user to request data from a data source over the Hypertext Transfer Protocol and receive results back from the data source in OData format or other formats such as Atom Publishing Protocol (Atom), JAVASCRIPT Object Notation (JSON), and Extensible Markup Language (XML), etc. The OData protocol is increasingly used by mobile computing and other computing platforms, such as smartphones and tablet computers, as an important method of access to information over networks. As will be appreciated by those skilled in the art, the use of OData, HTTP(S), RFC, XML/JSON, and the like can be substituted for other protocols, computer languages, etc. The exemplary use of a protocol, computer language, etc. in this disclosure is not meant to be limiting in any way. Other appropriately formatted requests in any protocol and/or computer language are also considered to be within this scope of this disclosure.

The API consumer 102 can technically be a server or client depending on the initiation of a specific API request. The API consumer 102 is communicably coupled with the API management system 104 (particularly the API gateway 114) with a non-directional communication channel. The API CDE 108 is an IDE that is used to develop an API for and to deploy the API to the API consumer 102. In some implementations, the API CDE 108 is extended by an integrated plug-in that connects the API CDE to the API administration system 104 (particularly to the API administration component 120) using a directional communicational channel The plug-in is used to explore APIs and to communicate API requirements to the API developer using the API administration component (described below).

The API management system 104 includes an API gateway 114, API description 116, API policy 118, and API administrative component 120. The API gateway 114 is a runtime component that enforces API policies 118 that are machine-readable policies that describe policies for a specific API. For example, API policies can include example quotas to control a maximum account of API calls per time unit, a user or group of users allowed to access and/or use the API, a service endpoint, a price per API call, subscription period, or data volume, and/or a supported identification protocol. The API description 116 is a machine-readable format of API metadata (e.g., structure, behavior, etc.). The API gateway 114 is the API endpoint to which a consumer of a managed API connects to. The API Gateway enforces a set of policies like quotas for data traffic and supported logon mechanism as part of a security policy. Information about assigned policies and the content of the assigned policy can reduce the implementation effort as the developer gets for example information on which logon mechanism needs to be supported and whether it is important to cache a specific API call on a client to stay in the limit of specific traffic quotas. The API gateway 114 is communicably coupled with the API provider 106 (a plug-in integrated into the API provider 106) with a non-directional communication channel.

The API administration component 120 is a component that provides and/or manages functionality for administration/definition of APIs and policies. The API administration component includes the administration console 122, administration API 124, service discovery 126, and service policy component 128. The administration component 120 can permit remote components (not illustrated) to administer APIs using the administration API 124. Note that the administration API 124 is the API that the API provider 106 uses to inform the API management system 120 of a deployed GUI. The service discovery 126 exposes a service to discovery services. In some implementations, the service discovery can work similar to OPENSEARCH technologies or a search service allowing search for specific services (e.g., search attributes can be service version, name, or free text search). The result of the service is search results contained in a machine readable-format with at least service name, service endpoint, and search documentation. In typical implementations, the service discovery 126 service is to be used by a developer. The administration console 122 is a user interface for administration of an API management system 120. The administration console 122 allows an administrator to perform tasks, including:

Registration of an API that is managed by the web services registry 110
Definition of API policies
Configuration of the API management system 120 to be able to connect to any API provider
Management of API developer accounts
Displaying statistics of API calls from any consumer
Trouble shooting The service policy component 128 manages service policies and provides system internal interfaces to the other components of the API administration component 120 to access or manipulate API policies. The API administration component 120 also supports discovery of APIs to support API developers (both API consumer and API provider). In some implementations, the information required to discover services (API's) is available at or using the API administration component 120. For example, the information might be replicated to store at the API administration component 120 or it might be only referenced. References would point to the service (API) endpoint which would provide the service (API) metadata like the OData metadata document. From a runtime perspective the service (API) resides at the API provider 106. In some implementations, universal description, discovery, and integration (UDDI) can be used to discover services that reside in non-enhanced systems.

The API administration component 120 is communicably coupled to the API provider 106 with a non-directional communication channel, the web services registry 110 (a plug-in integrated into the web services registry 110) with a non-directional communication channel, the API development environment 112 (a plug-in integrated into the API development environment 112) with a non-directional communication channel, and (and stated above) the API CDE 108 with a directional communication channel (requests flow to the API administrative component 120). The API administration component 120 can also modify the API description 116 and the API policy 118 (the API gateway 114 only has read access to each in the illustrated implementation). In some implementations, a plug-in can be used to provide the coupling between the API administration component 120 and the API provider 106. In some implementations, other methods of integration between the API administration component 120 and the API provider 106 are possible, for example:

- A plug-in (a locally-defined interface) that allows translation of the data representation of a specific API provider 106 to an internal representation of the API management system 104.
- A remotely-enabled API at the administration API 124 that is called from the API provider 106. The API provider 106 would translate the API internal representation to the representation of the administration API 124 component.

The API development environment 112 is an IDE used by API provider developers to develop APIs for the API provider 106. The web services registry 110 is any standardized service registry. In this context it is used to register and/or discover web services. In some implementations, the API Administration component 120 calls the web service registry 110 to collect API information for a user of the API administration component 120. In this case, the web services registry 110 is an information provider (services/APIs are already registered). The API administration component 120 uses information retrieved from the web services registry 110 to inform an administrator of the API management system 104 about a service URL, service metadata, etc. The API administration component 120 can also connect to the web services registry 110 to reduce the configuration effort for an administrator of assigning rules to specific API endpoints. The web services registry 110 can contain information to support the administrator's administration of policy configuration. In some implementations information can include an address of a service (API) and parameters, references to specification of interfaces, etc. The API development environment 112 is communicably coupled with the API provider 106 with a directional communication channel (requests flow to the API provider 106).

The API provider 106 includes a mock service provider 131, an integrated API provider 132, and a loosely coupled API provider 134. The API provider 106 is a runtime container that is used to provide an API. A deployed API on an API provider system can be either a server or a client (e.g., similar to a SOAP server or client depending on the initiator of a service request). The mock service provider 131 is used to provide a mocked service (or API), used if the API is in a process of development or if deployment of an API with a real API provider 106 is not possible for any reason. For example, if during a project, a third-party API that should be deployed at an API provider 106 cannot be deployed due to organizational reasons or because of technical dependencies that will be satisfied at a later phase of the project. The mock data service 131 allows a developer of a client to simulate API access even if access privileges are not available. The integrated API provider 132 is an enhanced (to integrate with the API management system 104) runtime container for an API such as a representational state transfer (REST) and/or a SOAP service and has the ability to inform the API administration component 120/API provider 106 about deployed, changed/modified deleted/deactivated APIs and/or unemployment of an API. The integrated API provider 132 includes an API provider productive 136, API provider test 138, and an API provider development 140. Software is usually developed in a development system using the API provider development 140, tested in a test system using the API provider test 138, and uses a copy of a production system to perform integration tests/production scenarios and uses the API provider productive 136. The loosely coupled API provider 134 is an enhanced system for integration into the API provider 106. The API provider uses standardized protocols (e.g., WSDL or ODATA metadata files) to obtain relevant information from this system.

The API administration component 120 is the component that is used to administer all API that are management by the API management system 104. The API administration component 120 provides an administration console 122 and an administration API 124 to manage APIs. Extending the administration API allows an integration of an API development environment 112 to provide further information to the API administration component 120. For example:

- API documentation to support service discovery
- Test data
- Service endpoint identification The artifacts developed at the API development environment 112 need to be deployed at an API provider to create a runnable instance of the API. During the development lifecycle, these API providers may activate or transport this content to other API providers (see below) (the API provider actively informs the API administration component 120 about these activities—which triggers automatic or manual steps at the API provider to assign API policies to the API and to deploy the policy with the assignment to the API gateway).

For example, the API development environment 112 deploys the artifacts that describe the API typically on a development system (e.g., API provider development 140) for development and development test purposes. At this stage, the API management system 104 is already integrated into the tests to allow end-to-end testing. The API is consumed through the API gateway 114 that enforces the policies that are assigned to the API. Policy description and enforcement is a state of the art and is not explained in this document.

After successful development and test, the artifacts that describe the API are deployed on a test system (e.g., API provider test 138). This is usually achieved by using functionality of the API provider 106. The API provider test 138 informs the API management system 104 about the availability of the API. Depending on the setup of the API administration component through manual or automatic steps, the relevant policy assignment is deployed on the API gateway 114.

After successful test on the API provider test 138 using the API gateway 114, the artifacts are again deployed on the API provider productive 136 and managed similar to the API provider test 138 deployment at the API administration component 120 and API gateway 114.

To achieve the example above the API provider needs to inform the API management system about deployed or changed APIs. The information contains at least an API identification (for example name and version), an API lifecycle status information that might be derived out of the API provider systems and the operation that triggered the API modification like "Activate" or "Changed".

Figure 2:
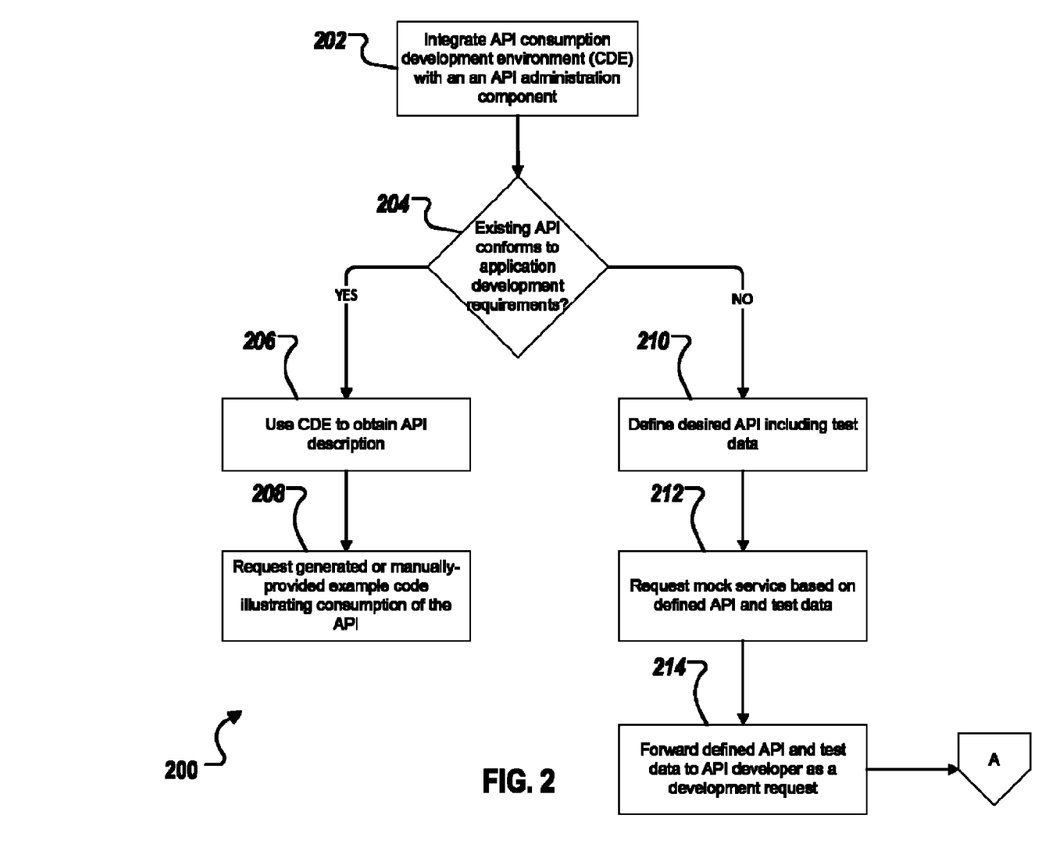
FIG. 2 is a flow chart of method illustrating the integration of an API consumption development environment with an API administration component according to an implementation.

FIG. 2 is a flow chart of method 200 illustrating the integration of an API consumption development environment with an API administration component according to an implementation. For clarity of presentation, the description that follows generally describes method 200 in the context of FIGS. 1 and 3-5. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

At 202, many developers of API consuming applications (e.g., developers of an IOS or ANDROID app or PHP-based web page) are using an IDE. As described above, the IDE (e.g., an API CDE 106) might be extended for example by a plug-in to integrate the API CDE into the API administration component 120. From 202, method 200 proceeds to 204.

At 204, a determination is made whether an existing API (or a web service of any type) conforms to application development requirements. If there is an API available, method 200 proceeds to 206. If there is no API that meets the requirement of the application to be developed, method 200 proceeds to 210.

At 206, the developer can use the IDE to get a description of the API (e.g., documentation and machine readable API description 116 (such as WSDL)). From 206, method 200 proceeds to 208.

At 208, the developer requests generated or manually-provided example code that illustrates the consumption of the API.

At 210, the developer of the API-consuming application may define (document) the API including test data. In some implementations, the API CDE informs the API administration component about the API documentation, test data to mock an implemented API at the actual service endpoint at which the implemented API can be reached. From 210, method 200 proceeds to 212.

At 212, developer requests that the API management system 104 provide a mock service based on the provided information. From 212, method 200 proceeds to 214.

Figure 3:
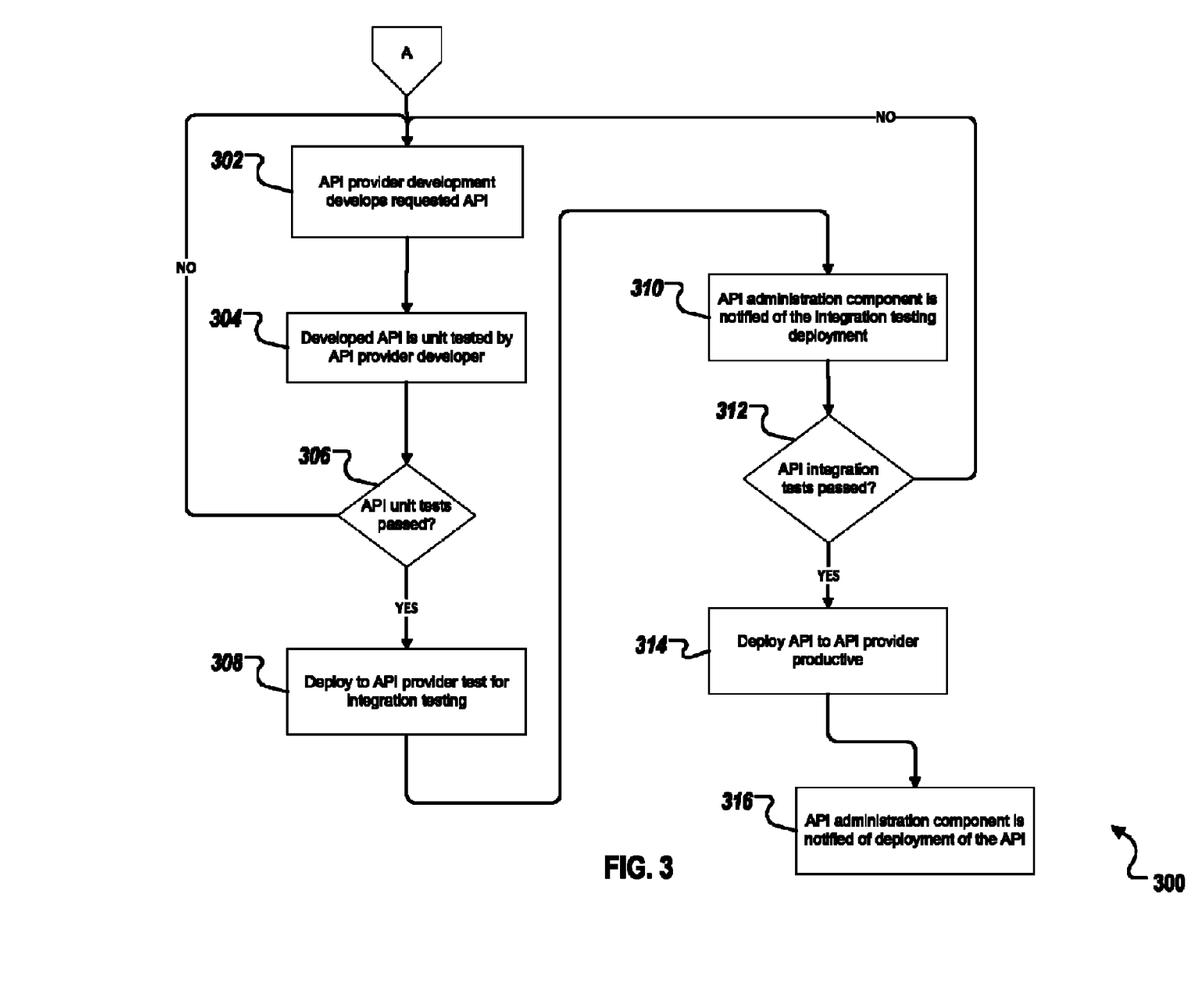
FIG. 3 is a flow diagram of method illustrating API provider API development or modification of an existing API according to an implementation.

At 214, the API Management system 104 forwards information to an API developer as a development request for the specified API. For example, the API CDE provides all required program artifacts (e.g., service structure in a computer readable format (e.g., WSDL), the service provider implementation in the format of any programming language, etc.) to the API provider development that are required to deploy the API (e.g., a SOAP service). After 214, method 200 proceeds to method 300 at 302.

In some implementations, an enhanced (rather than a new) API might be requested. In this case, it may be that only an additional field, property, etc. is needed. As should be apparent to those of ordinary skill, the described subject matter can be used in a manner to allow developers/consumers to develop, request, etc. additional/enhanced features for an API. The process can also be iterative over time.

FIG. 3 is a flow diagram of method 300 illustrating API provider API development or modification of an existing API, test, and deployment according to an implementation. For clarity of presentation, the description that follows generally describes method 300 in the context of FIGS. 1-2 and 4-5. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, and/or in any order. Please refer to FIG. 5 for an alternate flow to FIG. 3 that can be performed in some implementations.

At 302, the API provider developer develops requested API. From 302, method 300 proceeds to 304.

At 304, the developed API is unit tested by the API provider developer. The unit testing is documented at the API management system. Policies belonging to the API management system are tested as well. Note that as the API management system is lifecycle-aware, a particular policy may belong to a specific system instance that might be in development, test, productive, integration, regression, etc. (whatever defined for a particular landscape). In other words, a policy is marked to belong to a specific API version in a specific lifecycle phase. From 304, method 300 proceeds to 306.

At 306, a determination is made whether the API unit tests passed. If the unit tests passed, method 300 proceeds to 308. If the unit tests failed, method 300 proceeds back to 302 for additional development.

At 308, the API is deployed to API provider test for integration testing (e.g., on a dedicated integrated testing system). From 308, method 300 proceeds to 310.

At 310, the system informs the API administration component about the deployment of the API to the integration testing system. This information is used in an automatic or manual process to define an API policy to be used at the API gateway. The policies of the API gateway 114 are a part of the integration test so the test system informs the API management system 104 about the activation of a specific API. The API management system 104 already has certain information (e.g., policies used during unit testing) provided by the API development environment. This information is connected to the information about the service activation and allows a view of the API with all lifecycle stages to be provided to an administrator. From 310, method 300 proceeds to 312.

At 312, a determination is made whether the API integration tests passed. If the integration tests passed, method 300 proceeds to 314. If the integration tests failed, method 300 proceeds back to 302 for additional development.

At 314, the API is deployed to API provider productive, the productive runtime container for the API. From 314, method 300 proceeds to 316.

At 316, the system informs the API administration component about the deployment of the API to the API provider productive. This information is used in an automatic or manual process to define an API policy to be used at the API gateway. From 316, method 300 stops.

Figure 4:
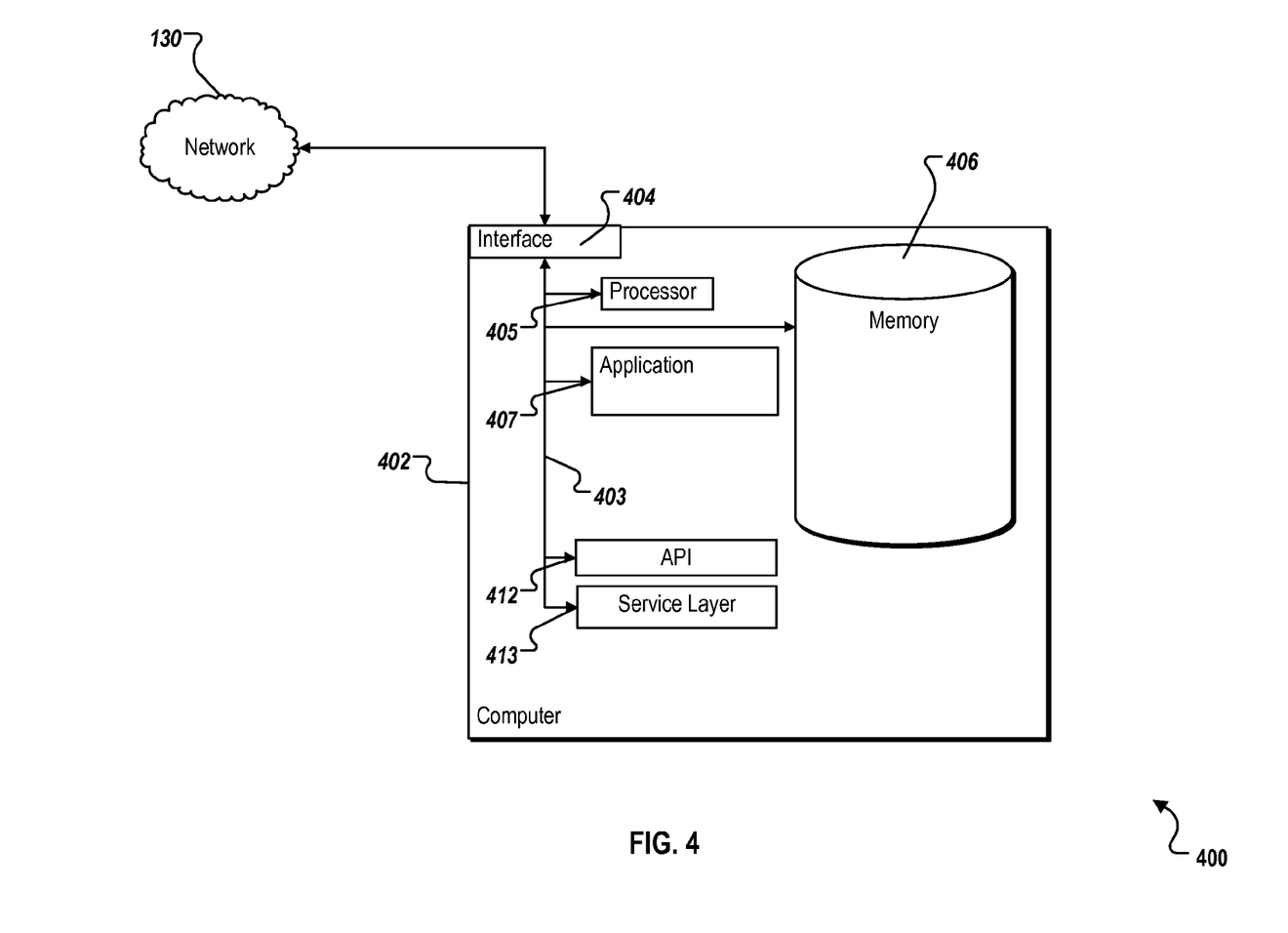
FIG. 4 is a block diagram of an exemplary computer used in the EDCS according to an implementation.

FIG. 4 is a block diagram 400 of an exemplary computer 402 used in the EDCS 100 according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 402 may comprise a computer that includes an input device, such as a keypad, keyboard, touch screen, or other device that can accept user information, and an output device that conveys information associated with the operation of the computer 402, including digital data, visual and/or audio information, or a GUI.

The computer 402 can serve as a client (e.g., client 102), network component, a server, a database or other persistency, and/or any other component of the EDCS 100. The illustrated computer 402 is communicably coupled with a network 430. In some implementations, one or more components of the computer 402 may be configured to operate within a cloud-computing-based environment.

At a high level, the computer 402 is an electronic computing device operable to receive, transmit, process, store, or manage data and information associated with the EDCS 100. According to some implementations, the computer 402 may also include or be communicably coupled with an application server, e-mail server, web server, caching server, streaming data server, business intelligence (BI) server, and/or other server.

The computer 402 can receive requests over network 430 from a client application (e.g., executing on another computer 402) and responding to the received requests by processing the said requests in an appropriate software application. In addition, requests may also be sent to the computer 402 from internal users (e.g., from a command console or by other appropriate access method), external or third-parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the interface 404 over the system bus 403 using an application programming interface (API) 412 and/or a service layer 413. The API 412 may include specifications for routines, data structures, and object classes. The API 412 may be either computer-language independent or dependent and refer to a complete interface, a single function, or even a set of APIs. The service layer 413 provides software services to the computer 402 and/or the EDCS 100. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 and/or the service layer 413 as stand-alone components in relation to other components of the computer 402 and/or EDCS 100. Moreover, any or all parts of the API 412 and/or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402 and/or EDCS 100. The interface 404 is used by the computer 402 for communicating with other systems in a distributed environment—including within the EDCS 100—connected to the network 430 (whether illustrated or not). Generally, the interface 404 comprises logic encoded in software and/or hardware in a suitable combination and operable to communicate with the network 430. More specifically, the interface 404 may comprise software supporting one or more communication protocols associated with communications such that the network 430 or interface's hardware is operable to communicate physical signals within and outside of the illustrated EDCS 100.

The computer 402 includes a processor 405. Although illustrated as a single processor 405 in FIG. 4, two or more processors may be used according to particular needs, desires, or particular implementations of the computer 402 and/or the EDCS 100. Generally, the processor 405 executes instructions and manipulates data to perform the operations of the computer 402. Specifically, the processor 405 executes the functionality required for providing lifecycle-aware application programming interface (API) management.

The computer 402 also includes a memory 406 that holds data for the computer 402 and/or other components of the EDCS 100. Although illustrated as a single memory 406 in FIG. 4, two or more memories may be used according to particular needs, desires, or particular implementations of the computer 402 and/or the EDCS 100. While memory 406 is illustrated as an integral component of the computer 402, in alternative implementations, memory 406 can be external to the computer 402 and/or the EDCS 100.

The application 407 is an algorithmic software engine providing functionality according to particular needs, desires, or particular implementations of the computer 402 and/or the EDCS 100, particularly with respect to functionality required for providing lifecycle-aware application programming interface (API) management. For example, application 407 can serve as one or more components/applications described in FIGS. 1-3. Further, although illustrated as a single application 407, the application 407 may be implemented as multiple applications 407 on the computer 402. In addition, although illustrated as integral to the computer 402, in alternative implementations, the application 407 can be external to the computer 402 and/or the EDCS 100.

There may be any number of computers 402 associated with, or external to, the EDCS 100 and communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Figure 5:
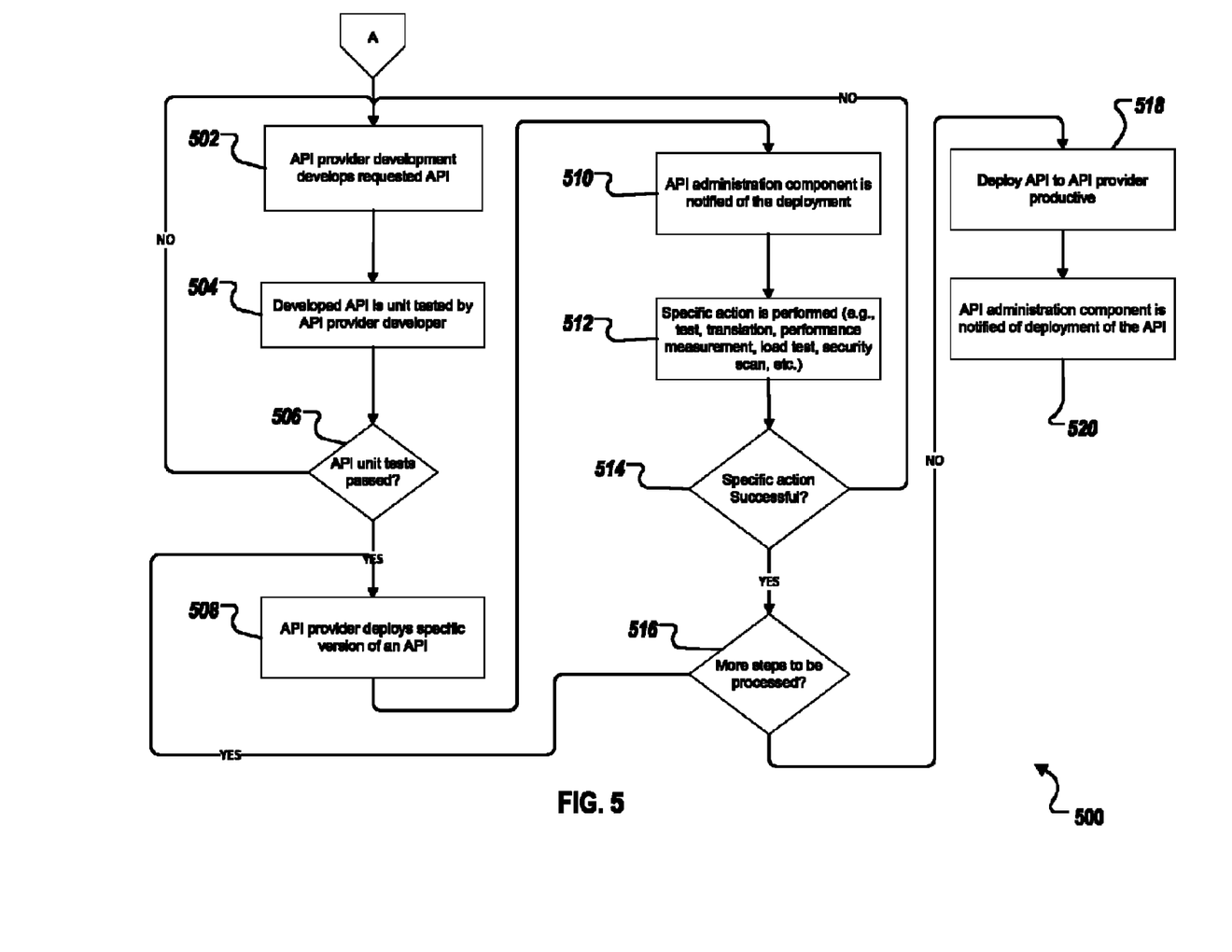
FIG. 5 is an alternative flow diagram of method illustrating API provider API development or modification of an existing API according to an implementation.

FIG. 5 is an alternative flow diagram of method 500 illustrating API provider API development or modification of an existing API, test, and deployment according to an implementation. For clarity of presentation, the description that follows generally describes method 500 in the context of FIGS. 1-4. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, and/or in any order. Note that some steps of method 500 of consistent with the description of method 300.

At 502, the API provider developer develops requested API. From 502, method 500 proceeds to 504.

At 504, the developed API is unit tested by the API provider developer. The unit testing is documented at the API management system. Policies belonging to the API management system are tested as well. Note that as the API management system is lifecycle-aware, a particular policy may belong to a specific system instance that might be in development, test, productive, integration, regression, etc. (whatever defined for a particular landscape). In other words, a policy is marked to belong to a specific API version in a specific lifecycle phase. From 504, method 500 proceeds to 506.

At 506, a determination is made whether the API unit tests passed. If the unit tests passed, method 500 proceeds to 508. If the unit tests failed, method 500 proceeds back to 502 for additional development.

At 508, an API provider deploys the specific version of an API. From 508, method 500 proceeds to 510.

At 510, the system informs the API administration component about the deployment of the API to a specific API provider that is configured to process a specific action described at 512. This can be an API provider that is exclusively used for the specific action or is able to perform one or more of these actions in sequence or parallel. This information is used in an automatic or manual process to define an API policy to be used at the API gateway. From 510, method 500 proceeds to 512.

At 512 a specific action is performed (e.g., test, translation, performance measurement, load test, security scan, etc.). From 512, method 500 proceeds to 514.

At 514, a determination is made whether the performed specific action was successful? If YES, method 500 proceeds to 516. If NO, method 500 proceeds back to 502 for additional development.

At 516, a determination is made whether more steps are left to be processed. If YES, method 500 proceeds back to 508. If NO, method 500 proceeds to 518.

At 518, the API is deployed to the API provider productive. From 518, method 500 proceeds to 520.

At 520, the system informs the API administration component about the deployment of the API to the API provider productive. This information is used in an automatic or manual process to define an API policy to be used at the API gateway. From 520, method 500 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for application programming interface (API) lifecycle awareness of an API management system, comprising:
    integrating an API consumption development environment (CDE) with an API administration component of the API management system and an API provider, wherein the API provider includes a mock service provider to provide a mocked service, an integrated API provider to integrate with the API management system and to inform the API administration component about an API, and a loosely coupled API provider for integration into the API provider;
    determining whether an existing API conforms to application development requirements;
    defining a desired API and including test data;
    forwarding, from the API management system, the desired API and test data to an API developer as a development request, the development request based on the desired API and the test data and including a request to mock the desired API as a service for an implemented version of the desired API at an actual service endpoint at which the desired API will be reached, the desired API developed as a developed API using the API CDE;
    deploying the developed API from the API CDE to the API provider creating an integration testing deployment; and
    informing, using the API provider, the API administration component of activation or transportation of development artifacts that describe the developed API to other API providers, wherein the informing triggers the API provider to assign API policies to the developed API and to deploy the API policies to an API gateway that enforces the API policies.

2. The method of claim 1, comprising:
    using the API CDE to obtain an API description; and requesting generated or manually-provided example code illustrating consumption of the developed API.

3. The method of claim 1, comprising unit testing the developed API.

4. The method of claim 3, comprising determining that the developed API has passed unit testing.

5. The method of claim 1, comprising:
    notifying the API administration component of the integration testing deployment; and deploying the developed API to an API provider productive of the integrated API provider for productive use; and notifying the API administration component of the deployment to the API provider productive.

6. A non-transitory, computer-readable medium storing computer-readable instructions for application programming interface (API) lifecycle awareness of an API management system, the instructions executable by a computer and configured to:
    integrate an API consumption development environment (CDE) with an API administration component of the API management system and an API provider, wherein the API provider includes a mock service provider to provide a mocked service, an integrated API provider to integrate with the API management system and to inform the API administration component about an API, and a loosely coupled API provider for integration into the API provider;
    determine whether an existing API conforms to application development requirements;
    define a desired API and including test data;
    forward, from the API management system, the desired API and test data to an API developer as a development request, the development request based on the desired API and the test data and including a request to mock the desired API as a service for an implemented version of the desired API at an actual service endpoint at which the desired API will be reached, the desired API developed as a developed API using the API CDE;
    deploy the developed API from the API CDE to the API provider creating an integration testing deployment; and
    inform, using the API provider, the API administration component of activation or transportation of development artifacts that describe the developed API to other API providers, wherein the informing triggers the API provider to assign API policies to the developed API and to deploy the API policies to an API gateway that enforces the API policies.

7. The medium of claim 6, comprising instructions to:
    use the API CDE to obtain an API description; and requesting generated or manually-provided example code illustrating consumption of the developed API.

8. The medium of claim 6, comprising instructions to unit test the developed API.

9. The medium of claim 8, comprising instructions to determine that the developed API has passed unit testing.

10. The medium of claim 6, comprising instructions to:
    notify the API administration component of the integration testing deployment; and deploy the developed API to an API provider productive of the integrated API provider for productive use;
    and notify the API administration component of the deployment to the API provider productive.

11. A system, comprising:
    a memory;
    at least one hardware processor interoperably coupled with the memory and configured to:
        integrate an API consumption development environment (CDE) with an application programming interface (API) administration component of an API management system and an API provider, wherein the API provider includes a mock service provider to provide a mocked service, an integrated API provider to integrate with the API management system and to inform the API administration component about an API, and a loosely coupled API provider for integration into the API provider;
        determine whether an existing API conforms to application development requirements;
        define a desired API and including test data;
        forward, from the API management system, the desired API and test data to an API developer as a development request, the development request based on the desired API and the test data and including a request to mock the desired API as a service for an implemented version of the desired API at an actual service endpoint at which the desired API will be reached, the desired API developed as a developed API using the API CDE;

deploy the developed API from the API CDE to the API provider creating an integration testing deployment; and inform, using the API provider, the API administration component of activation or transportation of development artifacts that describe the developed API to other API providers, wherein the informing triggers the API provider to assign API policies to the developed API and to deploy the API policies to an API gateway that enforces the API policies.

12. The system of claim 11, further configured to:
use the API CDE to obtain an API description; and requesting generated or manually-provided example code illustrating consumption of the developed API.

13. The system of claim 11, further configured to unit test the developed API.

14. The system of claim 13, further configured to:
determine that the developed API has passed unit testing;
notify the API administration component of the integration testing deployment;
deploy the developed API to an API provider productive of the integrated API provider for productive use; and
notify the API administration component of the deployment to the API provider productive.

* * * * *